(12) United States Patent
Ben-Dyke et al.

(10) Patent No.: US 8,706,779 B2
(45) Date of Patent: Apr. 22, 2014

(54) SYSTEM AND METHOD FOR DATA STORAGE

(75) Inventors: Andrew David Ben-Dyke, Camps End (GB); Thomas Benjamin Longshaw, Worcester (GB)

(73) Assignee: RainStor Limited, Gloucester (GB)

( * ) Notice: Subject to any disclaimer, the term of this patent is extended or adjusted under 35 U.S.C. 154(b) by 0 days.

(21) Appl. No.: 13/619,438

(22) Filed: Sep. 14, 2012

(65) Prior Publication Data

US 2013/0013568 A1 Jan. 10, 2013

Related U.S. Application Data

(63) Continuation of application No. 13/121,897, filed as application No. PCT/GB2009/002331 on Sep. 30, 2009, now Pat. No. 8,386,436.

(60) Provisional application No. 61/101,553, filed on Sep. 30, 2008.

(51) Int. Cl.
G06F 17/30 (2006.01)

(52) U.S. Cl.
USPC .......................... 707/809; 707/756; 707/661

(58) Field of Classification Search
CPC ............... G06F 17/30067; G06F 17/30008; G06F 11/1464; G06F 17/30297
USPC ............... 707/661, 999.204, 756, 809
See application file for complete search history.

(56) References Cited

U.S. PATENT DOCUMENTS

| | | | | |
|---|---|---|---|---|
| 5,375,501 A | * | 12/1994 | Okuda | 84/611 |
| 5,794,239 A | * | 8/1998 | Walster et al. | 1/1 |
| 5,889,674 A | * | 3/1999 | Burdick et al. | 700/121 |
| 6,785,689 B1 | * | 8/2004 | Daniel et al. | 707/754 |
| 7,287,048 B2 | * | 10/2007 | Bourbonnais et al. | 1/1 |
| 7,512,642 B2 | * | 3/2009 | Hernandez-Sherrington et al. | 1/1 |
| 7,720,918 B1 | * | 5/2010 | Martin et al. | 709/206 |
| 7,725,439 B2 | * | 5/2010 | Doney | 707/661 |
| 7,747,579 B2 | * | 6/2010 | Prahlad et al. | 707/672 |
| 7,849,065 B2 | * | 12/2010 | Kamani et al. | 707/705 |
| 7,870,173 B2 | * | 1/2011 | Bhogal et al. | 707/827 |
| 7,877,421 B2 | * | 1/2011 | Berger et al. | 707/809 |

(Continued)

FOREIGN PATENT DOCUMENTS

| | | | |
|---|---|---|---|
| JP | 2007-094539 A | 12/2007 | |
| JP | 2001-331315 A | 11/2011 | |

OTHER PUBLICATIONS

Brandl et al., "Long-term Archiving of Relational Databases with Chronos", First International Workshop on Database Preservation (PresDB'07), Mar. 23, 2007, 7 pages, accessed online at <http://homepages.inf.ed.ac.uk/hmueller/presdb07/papers/Germany_CHRONOS_PresDB07.pdf> on Mar. 28, 2013.*

(Continued)

*Primary Examiner* — Phuong Thao Cao
(74) *Attorney, Agent, or Firm* — Baker Botts L.L.P.

(57) ABSTRACT

In one embodiment, a method includes storing a first data table entry applying a schema used at a first point in time along with pointer data and pattern space information collectively representing the first data table entry at the first point in time and generating, at a later point in time, a map responsive to a schema change. The map comprises new pointer data or new pattern space information.

32 Claims, 8 Drawing Sheets

(56) References Cited

U.S. PATENT DOCUMENTS

| | | | | |
|---|---|---|---|---|
| 7,895,216 | B2* | 2/2011 | Longshaw et al. | 707/752 |
| 8,027,970 | B1* | 9/2011 | Brette et al. | 707/713 |
| 8,086,758 | B1* | 12/2011 | Allan et al. | 709/253 |
| 2004/0093344 | A1* | 5/2004 | Berger et al. | 707/102 |
| 2004/0215593 | A1* | 10/2004 | Sharangpani et al. | 707/1 |
| 2005/0138002 | A1* | 6/2005 | Giacobbe et al. | 707/3 |
| 2006/0106832 | A1* | 5/2006 | Ben-Dyke et al. | 707/100 |
| 2007/0011734 | A1* | 1/2007 | Balakrishnan et al. | 726/13 |
| 2007/0088771 | A1* | 4/2007 | Bhogal et al. | 707/205 |
| 2007/0100869 | A1* | 5/2007 | Doney et al. | 707/102 |
| 2008/0016074 | A1* | 1/2008 | Ben-dyke et al. | 707/7 |
| 2008/0222121 | A1* | 9/2008 | Wiessler et al. | 707/4 |
| 2008/0229037 | A1* | 9/2008 | Bunte et al. | 711/162 |
| 2009/0024587 | A1* | 1/2009 | Kamani et al. | 707/3 |
| 2009/0024650 | A1* | 1/2009 | Kamani et al. | 707/102 |
| 2009/0132466 | A1* | 5/2009 | Etherington et al. | 707/2 |
| 2009/0292745 | A1* | 11/2009 | Bose et al. | 707/204 |
| 2009/0307284 | A1* | 12/2009 | Welingkar et al. | 707/204 |
| 2009/0327321 | A1* | 12/2009 | McCormack et al. | 707/101 |
| 2010/0223276 | A1* | 9/2010 | Al-Shameri et al. | 707/769 |
| 2012/0096008 | A1* | 4/2012 | Inouye et al. | 707/743 |
| 2012/0197917 | A1* | 8/2012 | Koifman et al. | 707/756 |

OTHER PUBLICATIONS

David I. Boomer, "Relational Database Active Tablespace Archives Using HSM Technology", 2007, 4 pages, accessed online at <http://citeseerx.ist.psu.edu/viewdoc/summary?doi=10.1.1.184.909> on Mar. 28, 2013.*

Velegrakis et al., "Preserving Mapping Consistency under Schema Changes", The VLDB Journal (2004) 13: pp. 274-293 (20 pages), accessed online at <http://dl.acm.org/citation.cfm?id=1023919> on Mar. 28, 2013.*

Curino et al., "Automating Database Schema Evolution in Information System Upgrades", ACM, in HotSWUp'09, 2009, 5 pages.*

Moon et al., "PRIMA: Archiving and Querying Historical Data with Evolving Schemas", ACM, In Proceedings of the 2009 ACM SIGMOD International Conference on Management of Data, 2009, pp. 1019-1021.*

Pottinger et al., "Schema Merging and Mapping Creation for Relational Sources", ACM, In Proceedings of the 11th International Conference on Extending Database Technology: Advances in Database Technology (EDBT'08), Mar. 2008, pp. 73-84.*

Schaarschmidt et al., "Schema Versioning for Archives in Database Systems", In Proceedings of the Workshop on Evolution and Change in Database Management, Reverse Engineering in Information Systems, and the World Wide Web and Conceptual Modeling, 1999, pp. 87-97.*

Japanese Patent Office, Office Action (Reason for Rejection(s)) for JP Appl. No. 2011-528422, pp. 1-11, dated, Aug. 27, 2013.

* cited by examiner

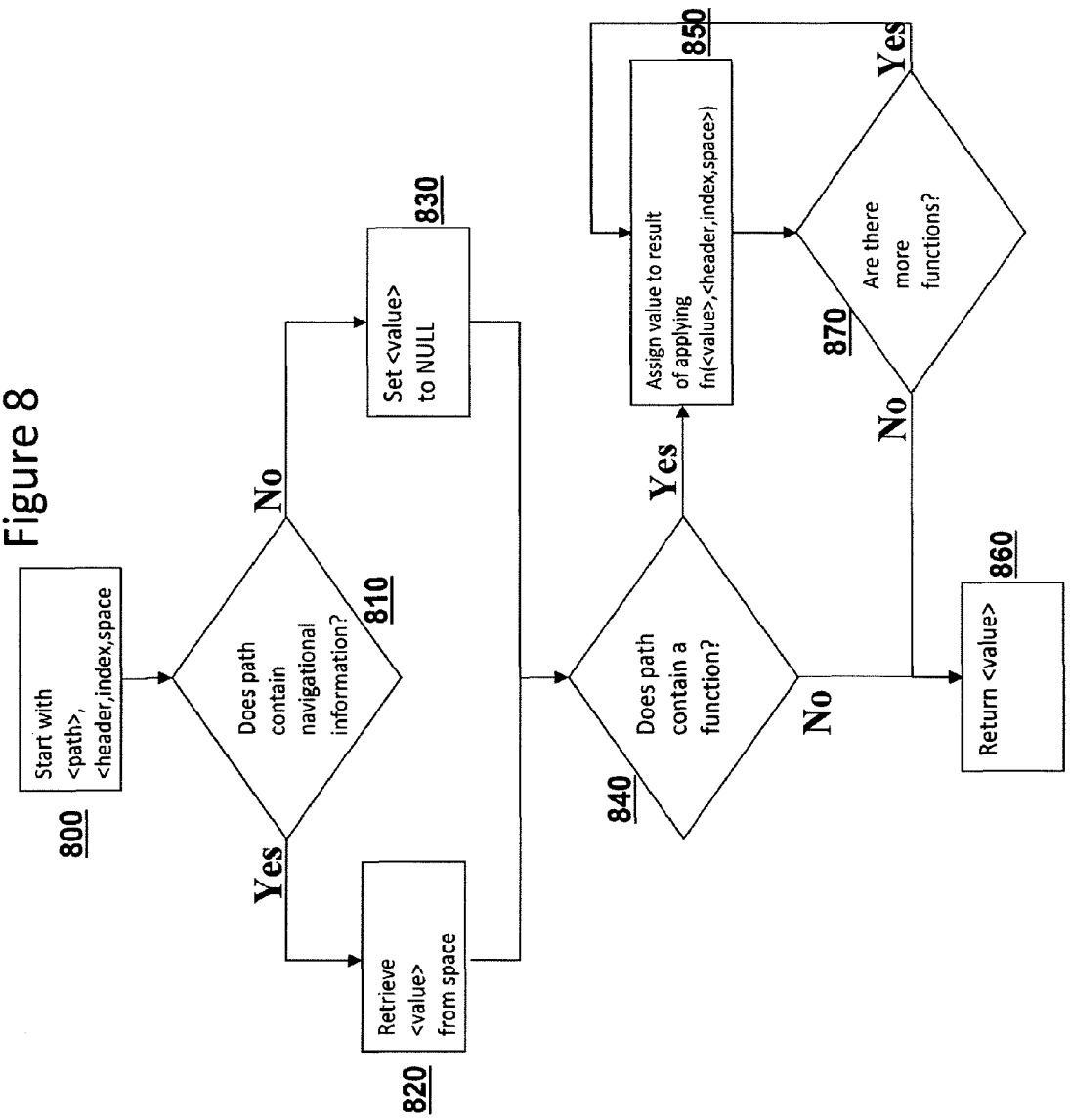

SYSTEM AND METHOD FOR DATA STORAGE

PRIORITY

This application is a continuation under 35 U.S.C. §120 of U.S. patent application Ser. No. 13/121,897, which is a national stage application under 35U.S.C. §371 of International Patent Application No. PCT/GB2009/002331, filed 30 Sep. 2009, which claims the benefit of U.S. Provisional Patent Application No. 61/101,553, filed 30 Sep. 2008, each of which is incorporated herein by reference.

TECHNICAL FIELD OF THE INVENTION

The present invention relates generally to data storage. More specifically, the embodiments of the invention relate to the various systems and methods for archiving and database management which, in particular, allow use of legacy data without substantial or any data modification.

BACKGROUND OF THE INVENTION

Many businesses and other organizations employ some form of large scale data storage as part of their information infrastructure. Many organizations store hundreds of terabytes, and even multiple petabytes (each of which is 1,000 terabytes), of data to facilitate routine business and record keeping. Data is added to these archives in a periodic fashion. Every week/month/year, or at whatever period the administrators (also referred to herein as "users") of the application deem appropriate, data is removed from a production system and put into the archive. However, this new data may not be in the same format as the data already in the archive.

In this context, a production system is any computer system or program running on a computer system operable to produce data tables, transmit said data tables to an archive and receive data back from said archive, in one format or another.

As time elapses, the nature or requirements of the applications whose data is being archived changes. For example, new data may be collected and stored in new columns in an existing table, or the accuracy with which data is stored may change (in other words the "type" of the column changes). Alternatively data that is no longer needed is not collected and the column is dropped from the table. When any of these changes occur (or other structural changes are made to the database) there remains the question of what happens to the data that is already archived. Some alternatives are listed below:

1. The archived data can all be recovered, have the same changes applied to it, and be resaved with those changes in place. However, not only is this a lengthy and expensive process, but also if the original data was archived for compliance purposes then there are potential issues with this form of recovery, since some part of the original data may no longer be stored. For example, casting a database field to a type with less precision (for instance reducing the number of decimal places of a fixed point type) will cause irrevocable data loss to the older archived data.

2. Take no action and leave the archived data unchanged. However, this will present problems when the data in the archive is queried. If the data is stored with multiple different schemas, it will be necessary to use different queries in each schema and also provide some additional procedure by which the results from these different queries are combined. Additionally, the results of the different queries may be formatted differently and be at different precisions.

No currently known technology provides a mechanism whereby a change to the database schema does not require modification to older data held in the archive, and at the same time enables queries written against the latest (in other words, current) schema to run against any and/or all data in the archive.

SUMMARY OF THE INVENTION

According to an embodiment of the invention, there is provided a method of operating a computer system for storing and retrieving data from a data store, wherein the computer system has a data manager device operable to manage patterns in the stored data along with pointers relating to the patterns in a manner which enables reconstruction of the stored data in original form, the method comprising: storing a first data table entry applying a schema used at a first point in time along with pointer data and pattern space information collectively representing the data table entry at the first point in time; and generating, at a later point in time, a map responsive to a schema change, wherein said map comprises new pointer data and or new pattern space information.

Preferably, pointer data comprises one or more of table meta data and index data.

Preferably, pointer data comprises header information defining aspects of a schema.

Preferably, pointer data comprises table meta data, and wherein the table meta data comprises one or more selected from: field of a table; type of field; maximum value of field minimum value of field; another attribute of a field.

Preferably, pointer data comprises index data defining an ordering of pattern elements within the pattern space.

Preferably, pointer data comprises path data defining how a control function should traverse pattern elements.

Preferably, path data comprises instructions on one or more transformations.

Preferably, pointer data duplicates at least a portion of the pattern space.

Preferably, at least a portion of pointer data is immutable.

Preferably, a schema change causes the map to indicate changes to old pointer information.

Preferably, a schema change causes the map to indicate coalesced pointer information.

Preferably, a recursive process is employed to determine the data entry from coalesced pointer information.

Preferably, the schema change comprises dropping a column, and wherein the map indicates new columns, old index data and old pattern space information.

Preferably, the schema change comprises renaming a column, and wherein the map indicates a new column name and an old column name to be hidden.

Preferably, the schema change comprises adding a column, and wherein the map indicates new column information selected from: a null value; a literal default value; and a function of a value in another column.

Preferably, the map indicates new column information at least in part by reference to path data.

Preferably, the path data comprises one or more of navigation data and functional elements.

Preferably, the schema change comprises retyping a column, and wherein the map indicates at least one transformation leading to an entry in the new column.

Preferably, the schema change comprises retyping a column, and said transformation is defined at least in part by path data.

According to one aspect of the invention, there is provided a method as described above further comprising the step of querying stored data at a previous point in time, and wherein the data manager accesses at least one map generated responsive to a schema change to derive data supporting a query at that previous point in time.

Preferably, the schema change comprises splitting a column, and wherein the data manager generates map data relating to adding new columns and dropping a column.

Preferably, the schema change comprises merging a column, and wherein the data manager generates map data relating to dropping columns and adding at least one new column.

According to one embodiment of the invention, there is provided a computer system for storing and retrieving data from a data store, the computer system comprising: a pattern manager device operable to manage patterns in the stored data along with pointers relating to the patterns in a manner which enables reconstruction of the stored data in original form; a storage device for storing a first data table entry applying a schema used at a first point in time along with pointer data and pattern space information collectively representing the data table entry at the first point in time; and a map generator for generating, at a later point in time, a map responsive to a schema change, wherein said map comprises new pointer data and or new pattern space information.

According to one embodiment of the invention, there is provided a computer system for storing and retrieving data from a data store, comprising a data manager device operable to generate and manage ancillary data relating to (i) a plurality of data tables within the data store and (ii) a plurality of schema applied to produce said data tables, wherein said ancillary data comprises indication of at least one pattern within a pattern space of the data store and reference data from which individual field values of data tables can be determined from the pattern space.

According to one embodiment of the invention, there is provided a computer implemented method for handling archived data, the method comprising the steps of: transferring an extract of data from a data repository to an archive at a point T in time, wherein the data is represented by a first schema at time T; storing the at least one extract of data as a combination of (i) a header portion (ii) an index portion and (iii) a pointer to at least one pattern space in the archive, wherein the header portion contains information on how to interpret the patterns in the pattern space in order to recover the data in the form it existed in the data repository, and the index portion identifies patterns from within the pattern space that represent entire data records from the repository; receiving a data query at a time later than T wherein the data schema in the repository has changed to a second schema which differs from the first; returning, in response to said data query, data from the archive utilising data in said header portion, index portion and pattern space such that the first schema behaves in response to the query as if it had been created under the second schema.

Preferably, the step of querying further comprises performing a transformation on data.

Preferably, the transformation is selected from one or more of: dropping a column, renaming a column, adding a column, re-typing a column, querying at a point in time, splitting a column, merging a column.

Preferably, the at least one data extract is stored as immutable data.

Preferably, the header portion comprises at least (i) the names of the fields that appear in the records of the table and (ii) the types of these fields.

Preferably, the data repository is a: relational database, data warehouse or a star schema database.

According to one embodiment of the invention, there is provided a data structure for use in a computer system, the data structure comprising: (i) a pointer to a pattern space, wherein the pattern space comprises one or more patterns that have been discovered in an original data source; (ii) an index portion, wherein the index area identifies patterns from within the pattern space that represent entire data records from the original data source; and (iii) a header portion, wherein the header portion comprises metadata describing how to interpret the patterns in the pattern space in order to recover the data in the form it existed in the data repository, wherein collectively the header, index and pointer to the pattern space form a data extract describing the state of a data source at a point in time.

Preferably, the two or more extracts share a single pattern space.

According to one embodiment of the invention, there is provided a method of querying archived data, the method comprising the steps of: storing the data in a table T, wherein T is the union of two or more data table extracts T1, T2, T3 ... TN, each extract having a different schema describing its data and stored in an archive; generating a map representing each schema change between extracts T1, T2, T3 ... TN, receiving at a query manager a user request for data contained in one of the extracts; and applying the relevant map such that the query manager rewrites the schema of a first extract such that the data it represents behaves in response to the query as if it had been created under the schema of a second extract.

Preferably, each extract comprises immutable data.

According to one embodiment of the invention, there is provided a legacy data manager comprising: an interface configured to receive data from at least one production system; a pattern identifier operable to receive said data, find patterns in said data, store the identified patterns in a memory and generate a representation of the patterns using pointers; an index manager operable to receive said data, identify an index area, store said index in said memory, and generate a representation of indices using pointers; a header manager operable to define a header area, store it in memory, and generate a representation of headers using pointers; an interface with at least one data archive on a storage device configured to transfer data from the memory to the archive.

According to one embodiment of the invention, there is provided a computer system for archiving data comprising: a legacy data manager as described above; at least one data archive residing on a storage device operably connected to the legacy data manager; and at least one production system operable to generate data, operably connected to the legacy data manager.

Preferably, the computer system further comprises at least one user terminal interface for operably connecting at least one user terminal to the legacy data manager and/or production system, and configured to receive data queries.

Preferably, the user terminal is a personal computer, thin client device or any other suitable electronic apparatus.

BRIEF DESCRIPTION OF THE DRAWINGS

For a better understanding of the invention and as to how the same may be carried into effect reference will now be made, by way of example only, to the accompanying drawings, in which:

FIG. 8 illustrates the process by which a value is retrieved using a path according to an embodiment of the present invention.

Like reference numerals appearing in the appended drawings are to be interpreted as representing functionally equivalent features described throughout this specification, unless otherwise stated.

DETAILED DESCRIPTION

Figure 1:
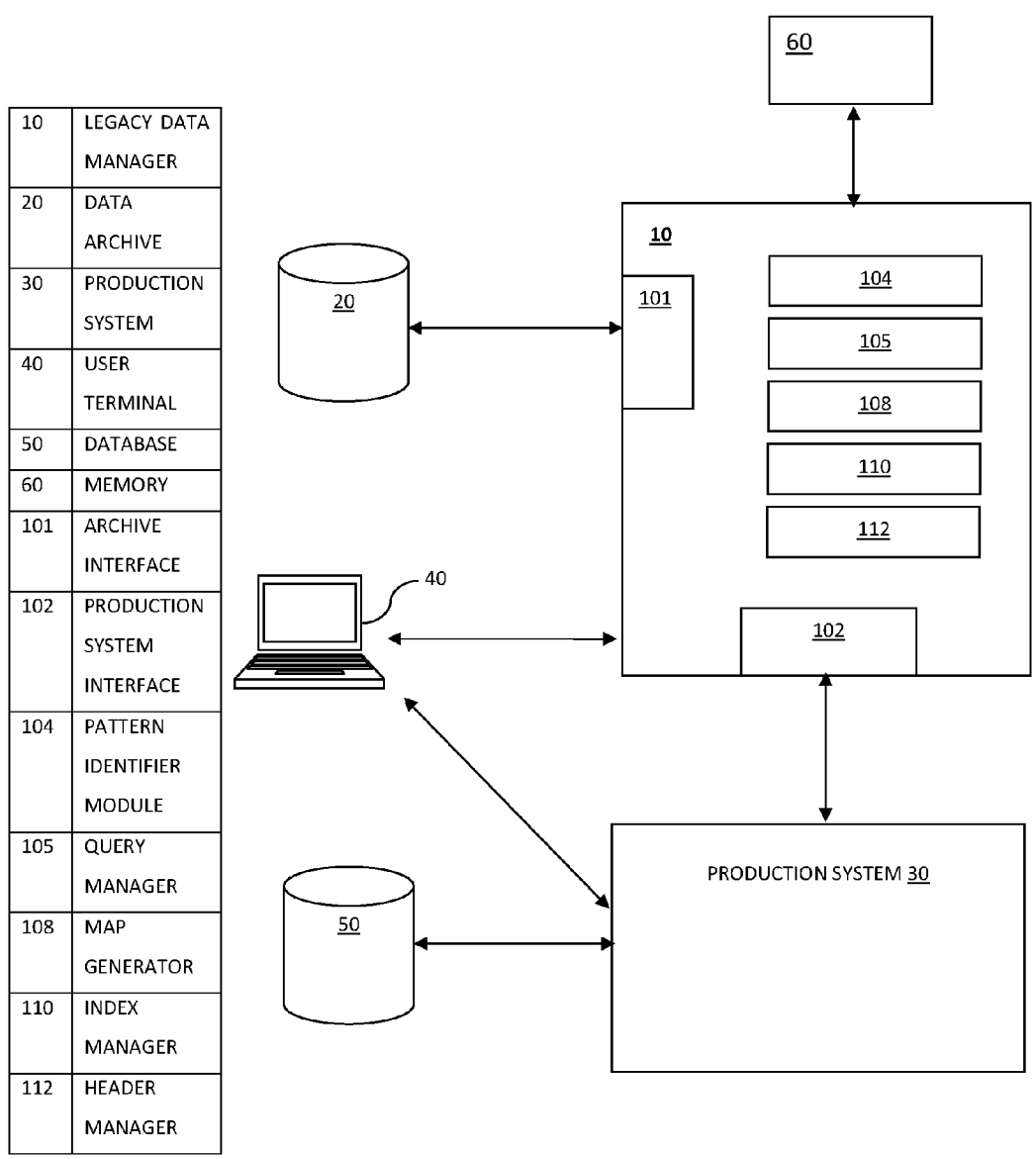
FIG. 1 is an illustration of a legacy data computer system according to an embodiment of the present invention.

FIG. 1 is an illustration of a legacy data computer system according to an embodiment of the present invention. The legacy data computer system comprises: a legacy data manager 10, at least one data archive 20 residing on a storage device and at least one production system 30. Optionally, there may also be present at least one user terminal 40 operably connected to legacy data manager 10 and/or production system 30 for receiving user data requests/queries. The user terminal is, for example, a personal computer, thin client device or any other suitable electronic apparatus.

The legacy data manager 10 comprises: an archive interface 101 operable to facilitate communication between the legacy data manager 10 and archive 20, a production system interface 102 operable to facilitate communication between legacy data manager 10 and production system 30, a pattern identifier module 104, a query manager 105, a map generator 108, an index manager 110, a header manager 112. Also operably connected to legacy data manager 10 is a memory 60.

Usually, the production system 30 generates and/or administrates at least one database 50. In the context of the present invention, the term "database" is intended to be construed broadly to describe any structured collection of records or data. It is not intended to be limited to any particular database model and may therefore be selected from one or more of: hierarchical model, network model, relational model or any other. According to one embodiment, the apparatus and methods of the present invention are applied to a relational database. According to another embodiment, the apparatus and methods of the present invention are applied to a star schema, or other data warehousing model. The generation and/or administration of data for the at least one database 50 may be done automatically by the production system 30, in response to user inputs to terminal 40, or a combination of both. In any event, data tables from the at least one database 50 are backed up into data archive 20 over time. According to the embodiments of the present invention this backup process is managed by the various components of the legacy data manager 10.

In order to carry out a database archiving operation, data must be transferred from database 50 to archive 20. However, according to one embodiment, data is not maintained in a separate database 50 and instead is transferred directly from production system 30 into archive 20 via the legacy data manager 10. In either case, this process may be initiated automatically by the legacy data manager 10, by the production system 30 and/or in response to user inputs, e.g. into to terminal 40. The result of the database archiving operation is that the archive 20 is populated with data archived at different points in the past. Inevitably, various changes may be applied to the data over time. In particular, the data schema may be changed according to the changing requirements of the database as time goes on. The term "schema" is used broadly herein to describe the structure of a database system, or in other words, it is metadata describing the data. In a relational database, for example, the schema defines the tables, the fields in each table, and the relationships between fields and tables. However, as stated above, the embodiments of the present invention are not limited only to relational databases.

Figure 2:
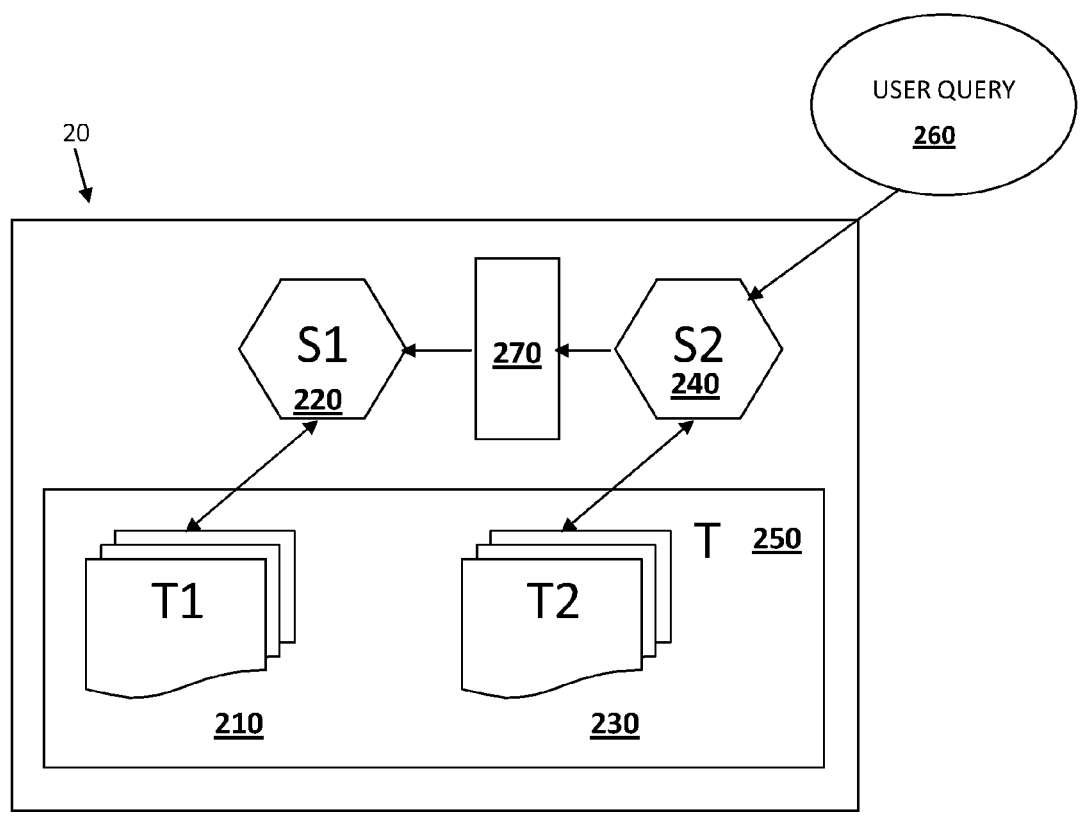
FIG. 2 illustrates an example of data archived by the legacy data manager 10 into archive 20 at different points in the past.

FIG. 2 illustrates an example of data archived by the legacy data manager 10 into archive 20 at different points in the past. Data is received by the legacy data manager 10 from the production system 30 through interface 102. According to one illustrative example, extracts of data are transmitted from production system 30 into the archive 20 at a number of different points in the past, where each extract is stored in the archive as a separate stand-alone data table. Between archive extracts, the schema used by the production system 30 is different. Thus, referring to FIG. 2, table T1 (210) created at time t1 uses schema S1 (220), and table T2 (230), which has the same name and general function in the production system 30, is created at time t2 (later than t1) with schema S2 (240).

According to one example, a user, for instance situated at the terminal 40, wishes to run a query 260 against data in the archive. In the example shown in FIG. 2, this query is run against table T (250). Table T (250) is the union of the extracts T1 (210) and T2 (220), as described above. Since T1 and T2 have different schemas it is not generally possible to write a single query that validly runs against both tables. However, according to the embodiments of the present invention it is possible to retain the original data stored in T1 in an unchanged state. This is by virtue of a map 270 created by map generator 108. According to the example, in response to the schema change that occurred prior to the archiving of T2, map generator 108 creates a map 270 that surrounds T1, rewrites its schema and allows the original data to behave in response to the query 260 exactly as if it had been created under schema S2. The function of the map 270 is described in more detail below. Broadly, however, the map 270 represents function(s) that allow the schema 220 to behave as if it is a copy of schema 240.

The query manager 105 is operable to receive user queries, for example, from user terminal 40 and, using map 270, run said user query 260 against data that has been stored using both schemas S1 and S2. The effect of this is that data stored using different schemas behaves to the query as if it had been written using a single schema, e.g. in this case S2.

Data Organization

According to an embodiment of the present invention, a temporary database is created in memory 60 by legacy data manager 10 from a set of data (i.e., a "data set") produced by the production system 30 by identifying patterns in the data set, storing the patterns in the temporary database, and generating a representation of the database structure using pointers to the stored patterns. According to a preferred embodiment, this representation is a triple of <header, index,(pattern) space>, which will be described in more detail below.

In the context of the present disclosure, "pointers" refer to a data type whose value refers directly to (in other words "points to") another value stored elsewhere in the archive 20 using its address. When setting up data structures such as lists, queues, trees or any other, it is useful to have pointers to manage the way in which the structure is implemented and controlled. The use of pointers may allow for more rapid searching, sorting, and other operations on the database because these operations can be performed using individual patterns to represent field values of many records (tuples) in a single operation. Note: the terms "tuple", "row", and "record" are used interchangeably throughout this specification.

Embodiments of the present invention may, for example, use and manipulate such a database as described in International Patent Application Publication No. WO 02/063498, Method of Querying a Structure of Compressed Data.

The following embodiments, and where appropriate, examples, are described with reference to a data set for a table in archive 20, which may be for example a relational database, a database according to another hierarchical model, or a database according to any other database model. However, the described embodiments can also be used across several tables rather than for only a single table, and the description herein should not be considered as limiting the embodiments of the present invention to operating only on a single table of a database.

Figure 3:
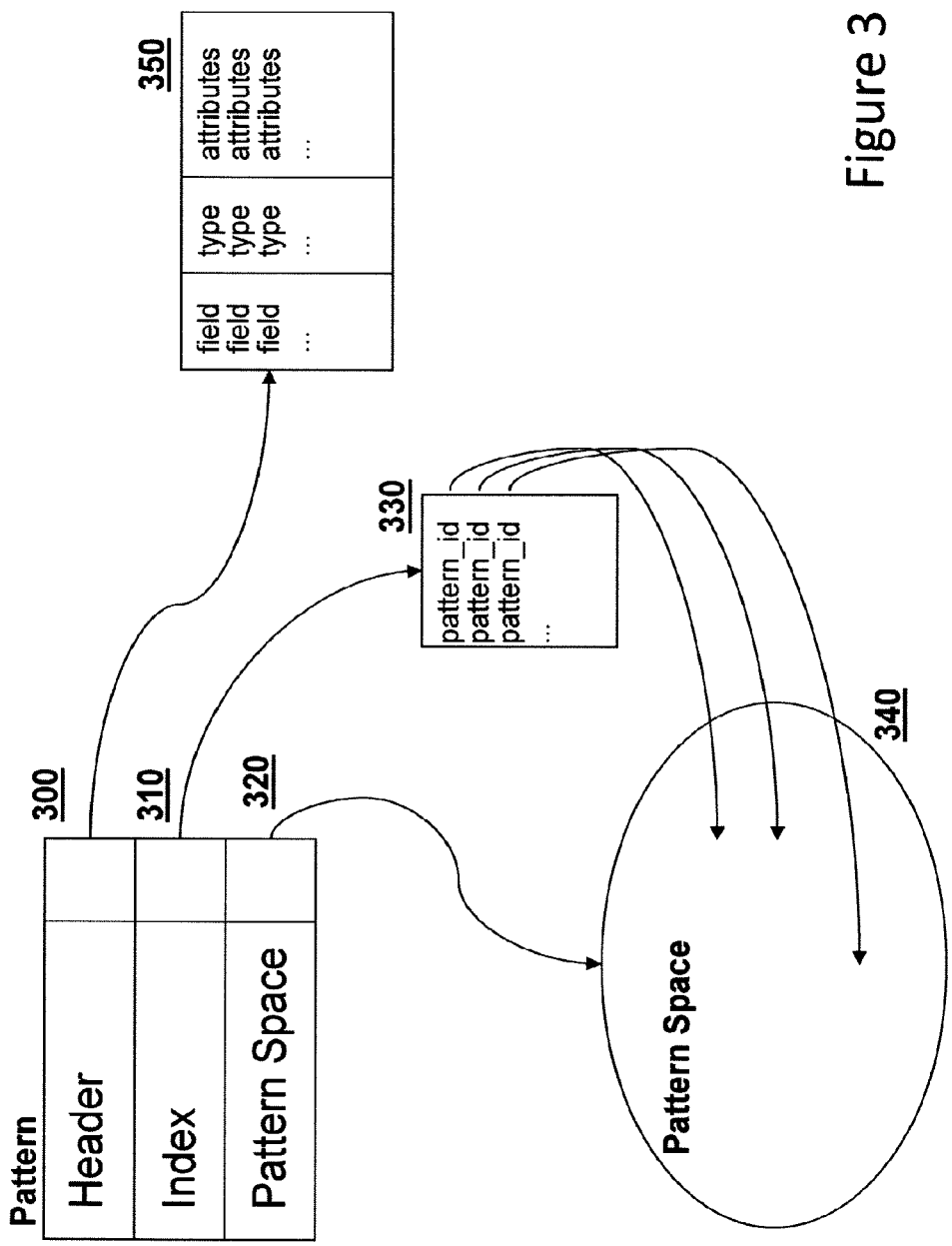
FIG. 3 illustrates an example of the representation of a table of data in archive 20 according to an embodiment of the present invention.

FIG. 3 illustrates an example of the representation of a table of data in archive 20 according to an embodiment of the present invention. According to a preferred embodiment, the original data table is received by the legacy data manager 10 from the production system 30 and is divided into three separate constituents. According to one embodiment, this separation process takes place in memory 60, which is most typically a volatile memory such as a Random Access Memory (RAM), however, other types of memory may be used where appropriate. After the data table has been manipulated into the three constituents, it is written to the archive 20 via interface 101.

The first constituent is the pattern space 340, referred to by pointer 320. The pattern space 340 is a random access area where the patterns that have been discovered in the original data table are stored. The process of identifying and storing patterns discovered in the data table is managed by the pattern identifier 104, which is operable to receive data from the production system 30 through interface 102, find patterns (e.g. using a suitable algorithm), store the identified patterns in memory 60 and generate a representation of patterns using appropriate pointers accordingly. According to a preferred embodiment, this representation is used to form a triple of <header, index, (pattern)space>.

The term "pattern space" is used herein to broadly describe a repository of all instances of data received by the legacy data manager and ultimately stored in archive 20. In other words, the pattern space 340 is a pool of data populated from the production system 30 and/or original database 50. One example of how the patterns are discovered and generated can be found in U.S. patent application Ser. No. 11/244,347 "Method and System for Implementing An Enhanced Database".

The use of pointers to reference the patterns is advantageous in that it can greatly reduce the amount of memory or other space required to store the data set by replacing duplicate patterns with additional pointers, which are normally considerably smaller in size than the patterns themselves.

The second constituent is the index area 330, referred to by pointer 310. The index area 330 identifies patterns from within the pattern space 340 that represent entire data records from the original data table. In essence, an index embodies a particular ordering with which the records are visited, and the index area is a repository of all such indices. Typically the index dictates the order in which the records appeared in the original table, but not necessarily. For example, it is also possible to have an index that references only a subset of the original records.

The index area is identified and managed by index manager 110, which is operable to receive incoming data from interface 102, manipulate said data in order to identify the index area, store this information in memory 60, and generate a representation of indices using appropriate pointers accordingly. According to a preferred embodiment, this representation is used to form the triple of <header, index,(pattern) space> as mentioned above, which is also generated in memory 60 and sent to archive 20 accordingly.

The third constituent of the structure is the header area 350, referred to by pointer 300. The header area 350 embodies the meta data associated with a given table. The header 350 is a part of the archive and, as such, is immutable in the sense that, once committed to the archive, it is not changed. If it is necessary to change the header, another header is created to represent the new header. Further, the header does not alter the data in the pattern space or elsewhere in the archive, again retaining immutability. Instead, the header provides information on how to interpret the patterns in the pattern space in order to recover the data that was in the table.

The meta data in the header comprises: (i) the names of the fields that appear in the records of the table and (ii) the types of these fields, i.e. whether they are integer fields, text fields and so on. From the type of data field used, it is possible to determine how the data is represented and the operations that can be performed on the data. The header area 350 may contain other attributes of the field such as its maximum and minimum values, whether the field is read-only etc. All aspects of the header area 350 are managed by header manager 112 which is operable to manipulate data incoming through interface 102 in order to define the header area, store it in memory 60, and generate a representation of headers using appropriate pointers accordingly. According to a preferred embodiment, this representation is used to form the triple of <header, index,(pattern)space> as mentioned above, which is also generated in memory 60 and sent to archive 20 accordingly.

Another piece of meta data that the header area 350 stores is navigation information for a given field. Accordingly, the header 350 contains more information than the traditional database schema. The term "path" is used throughout the specification to broadly describe this navigation information. It describes the steps by which the legacy data manager 10 can start from an index entry in the index area 330 and recover the value of the field that appeared in the original record. This process involves the navigation of the pattern space 340. Recall that each index entry in index area 330 identifies a particular pattern that represents the entire data record within the pattern space 340. This particular pattern usually comprises pointers to other patterns which may themselves point to further patterns and so on. At the most basic level, there exist "primitive patterns" that represent the actual values of the fields for any given record.

In summary, the three constituents described above play an inter-dependent role, each depending on data stored in the archive. The pattern space is simply a collection of patterns. There may be many more patterns in the space than are required to represent a single table. For instance, the pattern space may represent many different tables, or different views of the same table. The index 330 identifies which patterns are present in this instance and the order that they appear. The combination of index and pattern space almost allows recreation of a conceptual table which is a collection of, for example, cells in rows and columns. For instance, with the pattern space and index it is possible to reconstruct the cells in the order that they appeared in the table. However, at this point only the patterns exist to populate the cells. In order to illustrate, there may be the pattern 20050806 in a cell, but that information could represent anything, e.g. 6 Aug. 2005, 8th Jun. 2005, the integer 20050806, the fixed point number 2005.0806 or many other things. It is not possible to complete the restoration of the original table without the header 350 which provides the information of how to interpret the patterns that are visible. Thus the header can be said to provide the information that traditionally appears in the schema for a table, however, as will be evident to the skilled person, the header does more than a schema. Neither the pattern space nor index contribute to the schema. Referring again to FIG. 2, the map 270 represents the function(s) that allow the header (or schema, when considered on a simpler level) 220 to behave as if it is a copy of header 240. Note that it is effectively the header that is the target of the query because only the header can deliver back the original record stream. The map is a conceptual device because, in practice, a new header is created (which is not shown) which contains new paths and each individual path contains the part of the mapping that allows one field within the header 220 to behave as if it is the equivalent field from header 240.

Once the above manipulation of data has been completed, i.e. the data table has been split into the various constituents as described above, the legacy data manager 10 transfers the data from memory 60 into archive 20 through interface 101. While according to one embodiment, a temporary database is utilised in order to temporarily store various types of data during manipulation, according to another embodiment the legacy data manager 10 may not utilise a temporary database and may instead manipulate data received from the production system 30 in memory on-the-fly in the same manner described above but store it directly into archive 20.

In summary, navigation of a path consists of visiting patterns within pattern space 340, and following pointers therein to reach sub-patterns until a primitive pattern is reached and can be returned in response to a query. The navigation of a path in this sense is managed by query manager 106. The query manager 106 identifies which pointer to follow from a particular pattern by the identity of the field a user is trying to retrieve. In other words, the path that is stored in the meta data (in header area 350) for a field therefore contains the instructions to determine which patterns the query manager 106 needs to traverse in order to reach the pattern corresponding to a given field. For example, assuming that every pattern in the pattern space 340 has been assigned a unique integer identifier and that an entry in the index area 330 is one of these identifiers, e.g. 626, a path might consist of a sequence of further integers (independent of those assigned to the patterns), e.g. 3, 0, 2.

Figure 4:
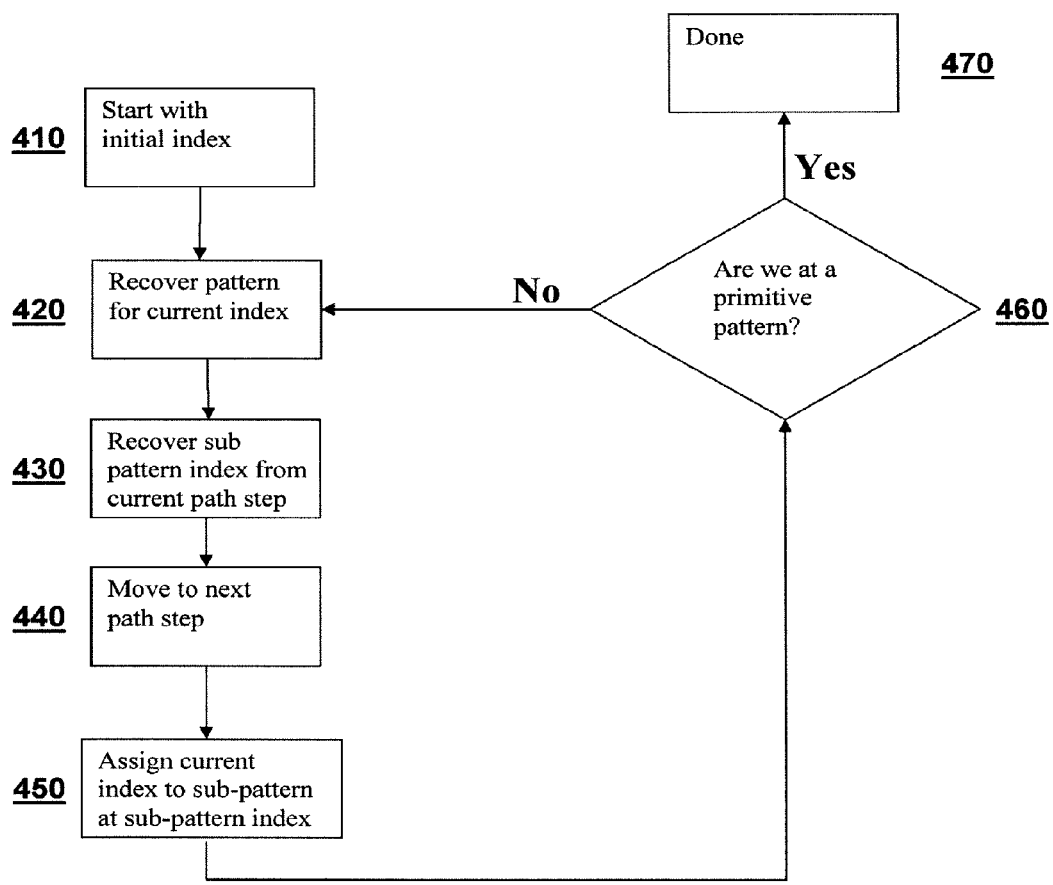
FIG. 4 shows an example of path and index entry according to an embodiment of the present invention.

FIG. 4 shows an example of path and index entry according to an embodiment of the present invention. The index entry value is input to the legacy data manager 10, e.g. by a user at step 410. Following the example from above, this value is 626. Hence, the pattern number 626 is recovered by the query manager 105 at step 420 and at this stage any sub-patterns are also identified by query manager 105. Following the example once again, it may be determined that the pattern number 626 contains 5 sub-pattern identifiers (e.g. 735, 102, 103, 416, 170). At step 430 the query manager 105 recovers the first integer from the path, e.g. 3. In other words, the path (as described above) may be [3,0,2] so the first integer is, as appears in the text, "3". The tuple <735, 102, 103, 416, 170> is the contents of a particular exemplary pattern. The integer "3", according to this example, provides the element of interest, i.e. in this case in the fourth element in the pattern, i.e. "416". The query manager 105 then operates to determine the next path element at step 440. At step 450, the query manager 105 assigns a current index to a sub pattern at the sub pattern index. The index contains pointers (in this example integers) that identify elements in the pattern space. When a path is followed, the query manager 105 starts with the current index set to the value read from the index. For example assume that the value read from the index is assigned to variable "ci". The value in "ci" is used to recover a pattern from the pattern space, e.g. <735, 102, 103, 416, 170>. The path is then used to identify that sub-element "3" (the fourth) is the one required, so that is assigned to ci, such that ci now contains 416. This process is repeated and pattern 416 is recovered from the pattern space. The next element in the path is 0, so the first value/pointer is taken from this pattern and it is assigned to "ci" and so on until the end of the path is reached. At step 460 it is determined by query manager 105 whether a primitive pattern has been reached. In order to determine this, query manager 105 tests whether there are still any steps remaining on the path. If the test determines that the end of the path has not been reached, the query manager 105 goes back to step 420, otherwise the process is deemed to be complete at step 470 and the current pattern index held identifies the primitive pattern corresponding to the required field for the given record in the table.

The header area 350 contains the meta data for each field and also the path (or navigation information), and the index area 330 contains a list of pointers (or indices) into the pattern space 340. However, the path need not consist simply of steps to follow through the pattern space. In addition, the path may also contain instructions on transformations to perform on the data that is fetched during a query. In the alternative, a path may simply contain a literal value or a reference to an existing primitive pattern.

The following operations are non-limiting examples of transformations which may be performed on the data during a query, according to embodiments of the present invention: 1. Dropping a Column; 2. Renaming Column; 3. Adding Column; 4. Re-typing a Column; 5. Querying at a Point in Time; and 6. Splitting/Merging a Column. These are typical operations performed on data in the archive 20 by the legacy data manager 10.

1. Dropping a Column

Dropping a column means removing a column from a data table. It occurs when the data held in that column is no longer required in the production system 30. To drop a column from an already archived set of data, i.e. a set of data stored in archive 20, it is sufficient just to remove the column from the header 350 associated with that data set. For example if an initial header 350 contains the following four fields, e.g.:

| A | INTEGER | attributes_A |
| B | CHAR(20) | attributes_B |
| C | DATE | attributes_C |
| D | FLOAT(15) | attributes_D |

Then to drop field B the header 350 can be replaced with:

| A | INTEGER | attributes_A |
| C | DATE | attributes_C |
| D | FLOAT(15) | attributes_D |

Figure 5:
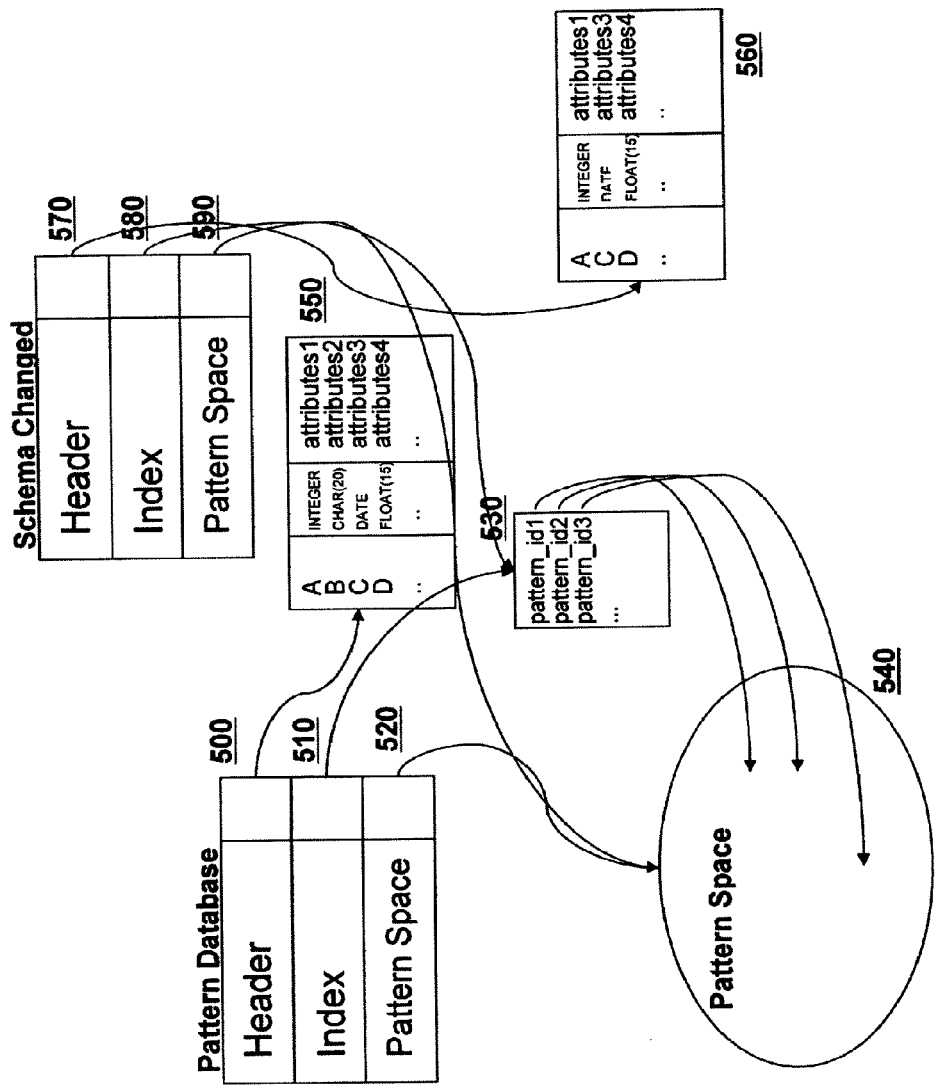
FIG. 5 shows more detail on how a column is dropped according to one embodiment of the present invention.

FIG. 5 shows more detail on how a column is dropped according to one embodiment of the present invention. In the example shown in FIG. 5, there are shown two "header/index/pattern" set triples. The first triple 500, 510, 520 contains a pointer to the original header 550 itself containing A, B, C, D. The first triple also contains the original index and the original pattern space. The second triple 570, 580, 590 contains a pointer to the new header containing A, C, D 560 but the old index 530 and the old pattern space 540. The index is shared in this instance because although a column has been dropped, the same records exist in the pattern space, albeit without column B in this case. It should also be apparent how, by using triple 500, 510, 520, it is possible to query the data in the form it existed before a schema change, and by using triple 570, 580, 590 it is possible to query it as it existed after the schema change.

When there are a large number of fields in the table, it might be considered wasteful to duplicate n−1 field entries in order to delete a single column. Therefore, according to another embodiment of the present invention, the header contains a pointer to the previous header and a list of the changes (or "deltas") made to this header. Storing information in this way is advantageous for several reasons, for instance, it may save large quantities of storage space, allow particularly efficient recovery of data and such like.

Figure 6:
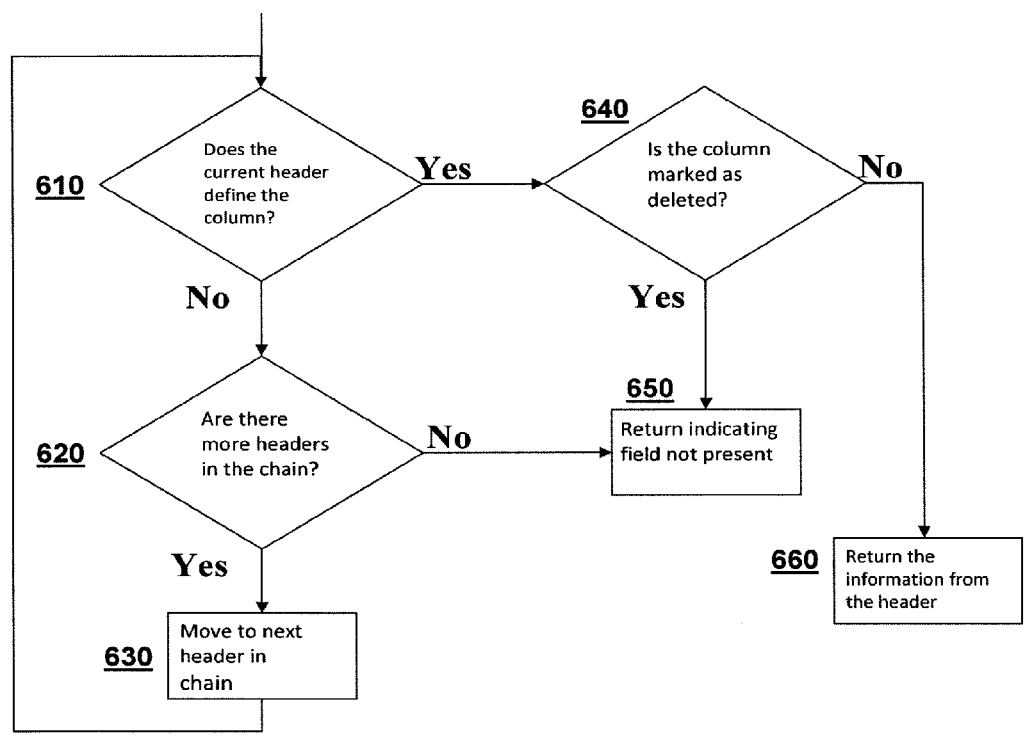
FIG. 6 illustrates an example of a procedure for retrieving column information according to an embodiment of the present invention.

FIG. 6 illustrates an example of a procedure for retrieving column information according to an embodiment of the present invention. In response to a user request, at step 610 the query manager 105 starts at the head of the chain of headers and tests if that header defines the column of interest (i.e. the column which the user wishes to drop in this case). If it does, then the query manager 105 retrieves the column information for that column and tests if the column is marked as deleted 640. If the item is not marked as deleted, then the query manager 105 returns the data for that column. Otherwise the query manager 105 moves to the next header in the chain 630 and repeats the test starting again from step 510. In order to delete a column using this method, the query manager 105 places a special marker in the header to indicate that the column is deleted. There are many ways to do this including, but not limited to, adding an extra flag/attribute to the header information to indicate deletion, setting the type of the column to NULL etc. In the example shown in FIG. 6, the column is marked as deleted 640 then the system returns an error to indicate that the column is not present 650. If the column is not marked as deleted at step 640, the query manager 105 returns the information from the header 660.

If a large number of schema changes take place, there may exist a long chain of headers that is unwieldy to use. Therefore, a further embodiment of the present invention allows for two or more elements in the chain to be coalesced into a single header that combines the effects of all of these elements. In order to illustrate, the following example is provided. Following an example from above in which three schema changes are performed, for instance "DROP COLUMN B", "DROP COLUMN D" and "DROP COLUMN A". In this example the result would be 4 headers (including the original one). According to one embodiment, "deltas" are utilized such that each header contains just the changes made since the last header was created, and a pointer to the previous header.

Therefore header 0 could be:
A,INTEGER, . . . .
B,CHAR(20), . . . .
C,DATE, . . . .
D,FLOAT(15), . . . .

After the first schema change, header 1 is then:
B,NULL, . . . .
<header 0>
(Recall that setting the type to NULL was one way to indicate that the column is deleted).
Header 2 is:
D,NULL, . . . .
<header 1>
Header 3 is:
A,NULL, . . . .
<header 2>

If these exemplary headers are coalesced then the deltas are "rolled up" to produce a single header that represents the combined effect of the four headers. This may be considered a recursive process, e.g. coalesce(header3)=remove(A,coalesce(header2)) etc. If this exemplary process is applied, the result is, for example, the header:
C,DATE, . . . .

Note that according to this embodiment, this header does not point to any other headers because it operates completely stand-alone and independent of any other the other headers which existed before.

2. Renaming a Column

According to the embodiments of the invention, when a column is renamed, it is only necessary assign a new name for that column in the header 300. For example if a user wishes to rename column "B" in the earlier example (see above) to "E", then the resultant header will be as follows:

| A | INTEGER | attributes_A |
|---|---|---|
| E | CHAR(20) | attributes_B |
| C | DATE | attributes_C |
| D | FLOAT(15) | attributes_D |

Note how all the attributes of the column apart from its name remain unchanged. When using a chain of headers it is necessary to provide an element of the chain that not only defines the renamed column, but that also hides the old name. For example:

| B | NULL | NULL |
|---|---|---|
| E | CHAR(20) | attributes_B |

3. Adding a Column

When adding a new column to a relational database it is necessary to define the initial values held in that column. Evidently, the existing table does not contain this column and the database requires to know the value(s) returned by requests for that column. These values are either defined as NULL, a literal default value for the column, or as a function of the value held in other columns in the table. According to embodiments of the present invention, this is accounted for using the "path" object that is one of the attributes of each field.

As stated above, the path combines navigational elements and functional elements. If the default value for the new column is a literal or NULL value that already appears in the pattern space then it is possible to assign a path to this column that retrieves that value from the pattern space 240. If the literal value does not appear in the current pattern space, then it is possible to add a path with no navigational information but just a simple function at the end of the path that returns the literal value.

The following is an illustrative example of adding a column involving a more complex function. Suppose that the original table contained two columns (amongst others) called "Cost" and "Price". For example:

| Cost  | INTEGER | attributes_cost  |
|-------|---------|------------------|
| Price | INTEGER | attributes_price |
| ...   | ...     | ...              |

If a user wishes to add a new column to the table, in this example called "profit" and whose values will be "price-cost", to do this the legacy data manager 10 creates a path that again has no navigational elements, but has a functional element that computes "price-cost" and returns its value.

Figure 7A:
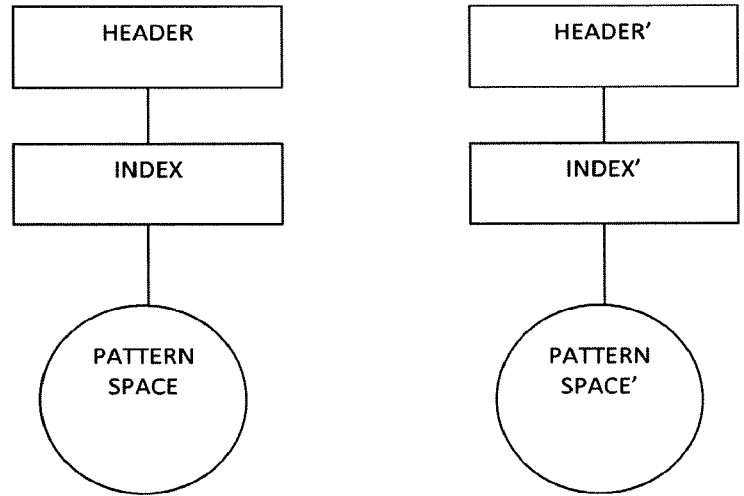
FIGS. 7A and 7B illustrate different possibilities for storing data according to embodiments of the present invention.
Figure 7B:
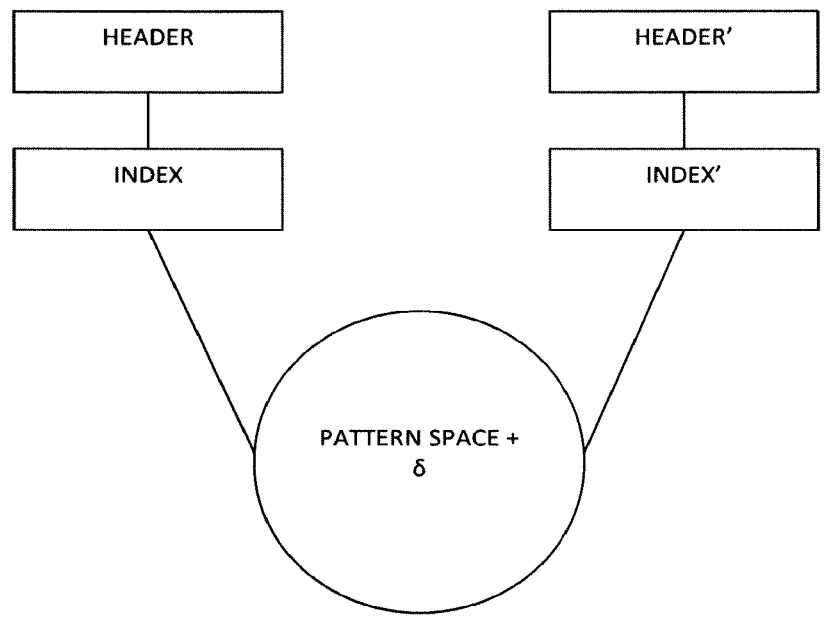

In the case where a user adds a column to a data table, there are several possibilities for how the data is stored. For instance, according to one embodiment, the original data table is stored as a triple of <header, index, pattern space> and the new data is stored as a triple of <header', index, pattern space'>, where pattern space' is a copy of all of the original data plus the new data (i.e. pattern space+additional data($\delta$)). According to another embodiment, once a change is made to the database (in this case adding a column), the additional data ($\delta$) may simply be stored in the original pattern space, without having a separate pattern space containing the original data plus the additional data. In other words, according to one embodiment, there is a single pattern space which is a repository for all patterns, and only a new header and index is created to reflect schema changes. Each time a change is made, a new header and index can be created and the additional data patterns added to the pattern space. These two possibilities are shown in FIGS. 7A and 7B.

As will be evident to the skilled reader, the different possibilities for archiving data in various combinations of the constituents (header, index, pattern space) apply to all relevant database changes, not just adding a column.

4. Re-Typing a Column

Re-typing a column commonly happens when the underlying application changes. For example, a production system may start recording times as well as dates on a transaction, or may record the price in dollars and cents rather than just dollars. When the type of a column changes it means that future values of that column will use a different representation to the values that have already been put into the archive. It is possible to change all the values already in the archive to match the new representation, but that would mean destroying the original data archived, not to mention being a lengthy and often expensive process. When a user wishes to query the old values in combination with the new values, it would be necessary to convert the old values to use the same representation as the new values. Also recall that the values themselves are a part of the pattern space, so cannot be transformed in place.

According to the embodiments of the invention, the transformation can be achieved by using the path structure again. After the schema change, the system rewrites the header entry so that the type of the column matches the new type. The path stored in the attributes for this column now becomes a copy of the previous path with an additional function added to the end of the path. This further function takes the value that would previously have been returned and rewrites it into the representation required by the new type. As an example, if the original field was called "price" and had an INTEGER value, and a schema change was performed to increase the precision to, for instance, DECIMAL(6,2). This exemplary new type represents a fixed point number with six digits, two of which are to the right of the decimal point. One way to represent such a number is to store it as an integer but to transform it appropriately before displaying any results. For example the value 43.57 could be stored internally as integer 4357.

Therefore, according to the embodiments of the present invention, it is possible to assign a new entry (for example "price") in the header that has a certain type (for example of DECIMAL(6,2)) and whose path is a copy of the previous path but with a new function added to the end of the path. This function takes the value in the original representation and multiplies it by an factor (e.g. 100) to bring its representation into line with that used by the new data. Under this new schema a value that was stored as 35, for example, would be returned by the path to the query as 3500.

5. Querying at a Point in Time

If a user wishes to query the archive, and in particular the data as it stood at a particular instance in time, it is important not just to identify the data that is presented at that point in time, but also the schema that applied to that data. As is evident from above, whenever a schema change is applied to the archive, the system creates a new <header, index, space> triple for each table and sub-table in the archive. The system also marks these triples with the date and time at which the schema was changed. When a user wishes to query the state of the archive at a particular point in time, then the system recovers the data that was present at that moment in time, and then for each pattern space representing a part of a table the system finds the corresponding triple that was active at that point in time. Once the system has collected these triples together, it now has the appropriate means to run a query against the database as it stood at a point in time.

6. Splitting/Merging a Column

Splitting a column may be considered a combination of adding two new columns (see point 3 above) and dropping one (see point 1 above). Similarly, merging a column may be considered dropping two columns and adding one new column.

FIG. 8 illustrates the process by which a value is retrieved using a path according to an embodiment of the present invention. At step 800, the query manager 105 starts with the path and a representation of the table which is a triple of <header, index,(pattern)space>. If the path contains navigational information 810 then the navigation information is used 820 by the query manager 105 to retrieve a value from the pattern space starting from the initial pattern identified by the index. If there is no navigation information then a useful default, for instance "NULL" is assigned to the value 830. If the path contains at least one function 840 then the system applies the function to the current value to obtain 850 a new value. Note that the system also passes the table triple into the function. This means that the function can also be used to retrieve and compute a result based on one or more further values from the table. If there are no further functions to apply 870 the system returns, typically to the production system 30 or terminal 40, the current value that the path has retrieved 860.

Those skilled in the art will appreciate that while this disclosure describes what is considered to be the best mode and, where appropriate, other modes of performing the invention, the invention should not be limited to the specific configurations and methods disclosed in this description of the preferred embodiment.

What is claimed is:

1. A method comprising:
  by one or more computing devices, receiving a query corresponding to a first schema of a first data extract associated with a pattern space;

by the one or more computing devices, accessing a second data extract associated with the pattern space, the second data extract having a second schema that is different from the first schema;

by the one or more computing devices, mapping the second schema of the second data extract to the first schema of the first data extract; and by the one or more computing devices, running the query against the second data extract based on the mapping;

wherein:
the first data extract comprises a first header portion, a first index portion, and a first pointer to the pattern space;

the second data extract comprises a second header portion, a second index portion, and a second pointer to the pattern space;

the second index portion is the same as the first index portion;

the second pointer to the pattern space is the same as the first pointer to the pattern space;

the first header portion comprises first metadata associated with the first data extract;

the second header portion comprises second metadata associated with the second data extract; and the mapping is based at least in part on the first header portion.

2. The method of claim 1, wherein the first metadata comprises names, types, and attributes of one or more first fields, and the second metadata comprises names, types, and attributes of one or more second fields.

3. The method of claim 2, wherein:
the first metadata comprises first path information associated with a particular one of the one or more first fields;
the second metadata comprises second path information associated with a particular one of the one or more second fields; and
the mapping is based at least in part on the first path information.

4. The method of claim 3, wherein the first path information indicates an entry in the first index portion that points to one or more patterns in the pattern space.

5. The method of claim 3, wherein the first path information comprises one or more functions.

6. The method of claim 2, wherein the one or more first fields comprise one or more, but not all, of the one or more second fields.

7. The method of claim 2, wherein the one or more second fields comprise one or more, but not all, of the one or more first fields.

8. The method of claim 2, wherein the one or more first fields comprise a renamed field of the one or more second fields.

9. The method of claim 1, wherein the first header portion comprises a pointer to the second header portion.

10. The method of claim 1, wherein the first data extract and the second data extract each comprise immutable data.

11. The method of claim 2, wherein the one or more first fields comprise a re-typed field of the one or more second fields.

12. One or more computer-readable non-transitory storage media embodying software that is configured when executed to:
receive a query corresponding to a first schema of a first data extract associated with a pattern space;
access a second data extract associated with the pattern space, the second data extract having a second schema that is different from the first schema;
map the second schema of the second data extract to the first schema of the first data extract; and
run the query against the second data extract based on the mapping;

wherein:
the first data extract comprises a first header portion, a first index portion, and a first pointer to the pattern space;

the second data extract comprises a second header portion, a second index portion, and a second pointer to the pattern space;

the second index portion is the same as the first index portion;

the second pointer to the pattern space is the same as the first pointer to the pattern space;

the first header portion comprises first metadata associated with the first data extract;

the second header portion comprises second metadata associated with the second data extract; and the mapping is based at least in part on the first header portion.

13. The one or more computer-readable non-transitory storage media of claim 12, wherein the first metadata comprises names, types, and attributes of one or more first fields, and the second metadata comprises names, types, and attributes of one or more second fields.

14. The one or more computer-readable non-transitory storage media of claim 13, wherein:
the first metadata comprises first path information associated with a particular one of the one or more first fields;
the second metadata comprises second path information associated with a particular one of the one or more second fields; and
the mapping is based at least in part on the first path information.

15. The one or more computer-readable non-transitory storage media of claim 14, wherein the first path information indicates an entry in the first index portion that points to one or more patterns in the pattern space.

16. The one or more computer-readable non-transitory storage media of claim 14, wherein the first path information comprises one or more functions.

17. The one or more computer-readable non-transitory storage media of claim 13, wherein the one or more first fields comprise one or more, but not all, of the one or more second fields.

18. The one or more computer-readable non-transitory storage media of claim 13, wherein the one or more second fields comprise one or more, but not all, of the one or more first fields.

19. The one or more computer-readable non-transitory storage media of claim 13, wherein the one or more first fields comprise a renamed field of the one or more second fields.

20. The one or more computer-readable non-transitory storage media of claim 12, wherein the first header portion comprises a pointer to the second header portion.

21. The one or more computer-readable non-transitory storage media of claim 12, wherein the first data extract and the second data extract each comprise immutable data.

22. The one or more computer-readable non-transitory storage media of claim 13, wherein the one or more first fields comprise a re-typed field of the one or more second fields.

23. A system comprising:
one or more computing devices, the one or more computing devices comprising one or more processors; and
a memory coupled to the one or more processors comprising instructions executable by the one or more processors, the one or more processors configured when executing the instructions to:
receive a query corresponding to a first schema of a first data extract associated with a pattern space;
access a second data extract associated with the pattern space, the second data extract having a second schema that is different from the first schema;
map the second schema of the second data extract to the first schema of the first data extract; and
run the query against the second data extract based on the mapping;
wherein:
the first data extract comprises a first header portion, a first index portion, and a first pointer to the pattern space;
the second data extract comprises a second header portion, a second index portion, and a second pointer to the pattern space;
the second index portion is the same as the first index portion;
the second pointer to the pattern space is the same as the first pointer to the pattern space;
the first header portion comprises first metadata associated with the first data extract;
the second header portion comprises second metadata associated with the second data extract; and
the mapping is based at least in part on the first header portion.

24. The system of claim 23, wherein the first metadata comprises names, types, and attributes of one or more first fields, and the second metadata comprises names, types, and attributes of one or more second fields.

25. The system of claim 24, wherein:
the first metadata comprises first path information associated with a particular one of the one or more first fields;
the second metadata comprises second path information associated with a particular one of the one or more second fields; and
the mapping is based at least in part on the first path information.

26. The system of claim 25, wherein the first path information indicates an entry in the first index portion that points to one or more patterns in the pattern space.

27. The system of claim 25, wherein the first path information comprises one or more functions.

28. The system of claim 24, wherein the one or more first fields comprise one or more, but not all, of the one or more second fields.

29. The system of claim 24, wherein the one or more second fields comprise one or more, but not all, of the one or more first fields.

30. The system of claim 24, wherein the one or more first fields comprise a renamed field of the one or more second fields.

31. The system of claim 24, wherein the one or more first fields comprise a re-typed field of the one or more second fields.

32. The system of claim 23, wherein the first header portion comprises a pointer to the second header portion.

* * * * *